(12) United States Patent
Tamai

(10) Patent No.: US 6,830,524 B2
(45) Date of Patent: Dec. 14, 2004

(54) CRANK DRIVE BELT SYSTEM WITH TRIPLE PULLEY TENSIONER

(75) Inventor: Goro Tamai, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 54 days.

(21) Appl. No.: 10/154,271

(22) Filed: May 23, 2002

(65) Prior Publication Data

US 2003/0220164 A1 Nov. 27, 2003

(51) Int. Cl.[7] ................................................ F16H 7/12
(52) U.S. Cl. ........................ 474/134; 474/135; 474/111
(58) Field of Search ................................ 474/134, 135, 474/136, 137, 133

(56) References Cited

U.S. PATENT DOCUMENTS

| | | | | |
|---|---|---|---|---|
| 3,811,332 A | * | 5/1974 | Brown et al. ............... | 474/111 |
| 3,895,544 A | * | 7/1975 | Suzaki ........................ | 474/87 |
| 4,069,719 A | * | 1/1978 | Cancilla .................... | 474/134 |
| 4,416,647 A | * | 11/1983 | White, Jr. .................. | 474/134 |
| 4,715,333 A | * | 12/1987 | Oyaizu ...................... | 123/90.31 |
| 4,758,208 A | * | 7/1988 | Bartos et al. .............. | 474/135 |
| 4,981,116 A | * | 1/1991 | Trinquard .................. | 474/134 |
| 6,511,393 B1 | * | 1/2003 | Bogl et al. ................. | 474/101 |
| 6,609,989 B2 | * | 8/2003 | Berger et al. .............. | 474/134 |
| 2002/0039944 A1 | * | 4/2002 | Ali et al. ................... | 474/135 |

FOREIGN PATENT DOCUMENTS

| | | | | |
|---|---|---|---|---|
| FR | | 2781008 A1 * | 1/2000 | ........... F01L/13/06 |

* cited by examiner

*Primary Examiner*—David A. Bucci
*Assistant Examiner*—Bradley J. Van Pelt

(57) ABSTRACT

Crank drive belt systems feature a triple pulley tensioner which may be applied in various ways to provide proper tensioning on belt spans adjacent a motor generator for both starting and generating functions of the system. The tensioner provides adequate belt wrap and damping functions for the systems. In a simplified embodiment, the belt system connects a crankshaft or crank pulley with a motor generator pulley and at least one accessory drive pulley, such as an air conditioner compressor. The triple pulley tensioner includes a fixed tensioner housing mounting a fixed rotatable pulley and two tensioner arms carrying pulleys for tensioning the belt spans on either side of the motor generator. The fixed pulley is positioned on a third belt span between the accessory and the crank and combines with the tensioner pulleys to maximize belt wrap around the MG pulley, the crank pulley, and the accessory pulley, if needed. Numerous alternative arrangements may be provided.

9 Claims, 1 Drawing Sheet

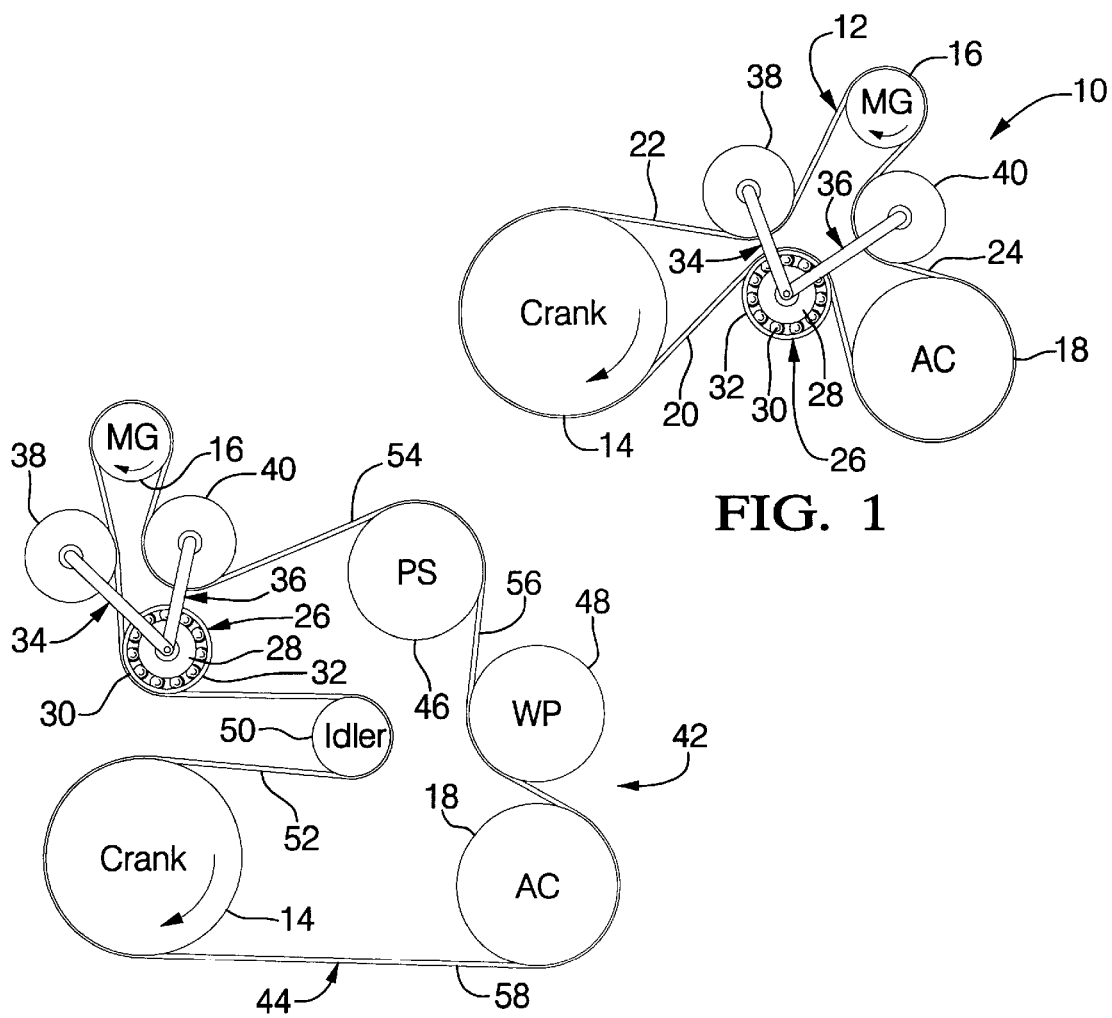
FIG. 1
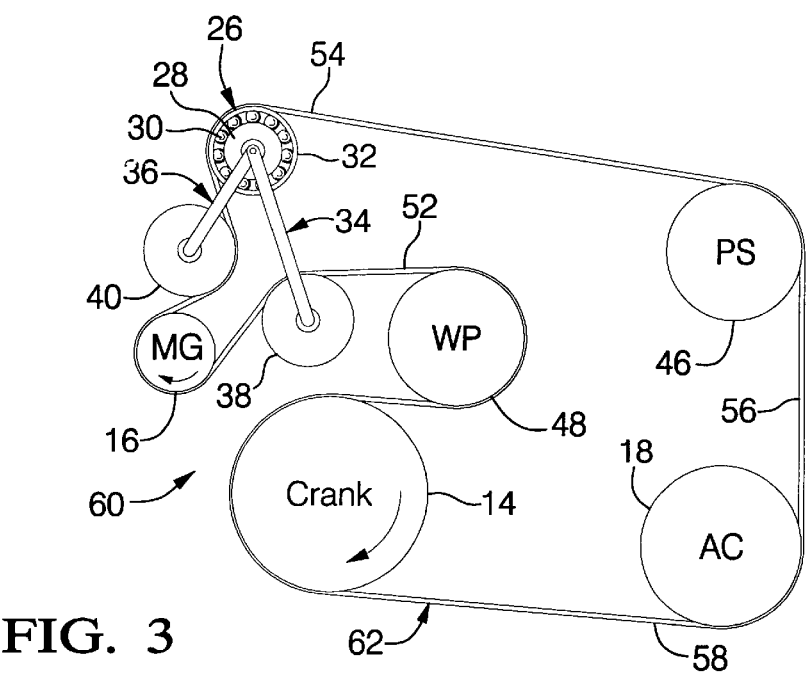
FIG. 2
FIG. 3

CRANK DRIVE BELT SYSTEM WITH TRIPLE PULLEY TENSIONER

TECHNICAL FIELD

This invention relates to crank drive systems connecting an engine crank and a motor generator for starting the engine and generating electrical power for starting and other vehicle purposes.

BACKGROUND OF THE INVENTION

To improve fuel economy, a vehicle engine can be stopped when the vehicle is stopped. An otherwise conventional engine can be modified to perform engine stop start (ESS) functions through a belt-driven motor generator (MG) system connected in the accessory drive. A single MG unit performs the functions of the starter motor and the alternator (generator). Since the belt drive and the MG are used to start the engine, the belt system must be designed for extra robustness against slip to maintain acceptable belt noise levels. A heavy duty multi-ribbed belt, similar in appearance to conventional accessory belts, may be used.

Two important parameters governing belt traction on the pulley grooves are belt wrap and belt tension. Since belt traction is a highly non-linear function of wrap angle, the wrap angle should be maximized within reason, such that excessive belt tensions are not required to prevent slip. The nominal belt tension needs to be optimized, balancing design factors such as belt slip, bearing loads, belt life and component packaging. In addition, the belt tension must be controlled to be consistent during engine speed transients and, in particular, changes in the belt loading from cranking to driving functions.

Conventional belt drive systems in vehicles not having ESS functions typically mount a single belt tensioner on the slack side of the crank pulley and generator. This serves to reduce the belt vibration, caused by crankshaft pulsations, between the crank pulley and the generator pulley. Belt driven ESS systems have been developed which incorporate a single tensioner on the tight side of the generator during generating. This is done so that during an engine start, the span between the MG and the crank is supported by a rigidly-mounted idler pulley.

If a single tensioner designed for proper tension and belt takeup were placed in that location, the tensioner would deflect excessively or abruptly bottom out in travel. Thus, the single tensioner placed on the tight side of the generator must necessarily over tension the belt to allow noise-free and slip-free operation during generating. Also, to reduce the belt vibration noise, very short spans may be necessary, which reduce the belt system robustness (for noise and durability) to small assembly misalignments. Another disadvantage of the single tensioner system is that the generating torque, or regenerative braking torque, is eliminated by belt slip. Thus, if the generating torque is large enough, all belt tension could be lost in the span between the crankshaft, driving pulley, and the MG-driven pulley.

Systems with dual arm tensioners have been developed but, due to packaging constraints, belt wrap may be sacrificed. Thus, to ensure slip-free operation, belt tension must be increased, which in turn reduces belt and bearing life. Therefore, a system was desired that can maximize belt wrap around the crank and MG pulleys while at the same time allowing optimal tensioning for both drive (generating) and cranking (motoring) functions and to dynamically follow the belt loads during transition from driving to cranking.

SUMMARY OF THE INVENTION

The present invention provides crank drive belt systems featuring a triple pulley tensioner (TPT) which may be applied in various ways to provide proper tensioning on the belt spans adjacent the motor generator for both starting and generating functions and which provide adequate belt wrap and damping functions for the systems. In a simplified embodiment, the belt system connects a crankshaft or crank pulley with a motor generator pulley and at least one accessory drive pulley such as an air conditioner compressor. The belt spans are tensioned by a triple pulley tensioner which includes a fixed tensioner housing mounting a fixed rotatable pulley and two tensioner arms carrying pulleys for tensioning the belt spans on either side of the motor generator. The fixed pulley is positioned on the third belt span between the accessory and the crank and combines with the tensioner pulleys to maximize belt wrap around the crank pulley, the MG pulley and the accessory pulley.

Preferably, the tensioner of the belt span between the crank and the MG pulley is designed to reach kinematic singularity when the MG is cranking the engine and the belt load is greatest between the MG and the crank pulley. Singularity means that the tensioner arm, or the belt, moves to a position where the force of the belt does not move the tensioner arm further toward a "bottomed out" position. Optionally, the second tensioner unit may also be positioned to reach kinematic singularity when the MG is driven by the crank. However, this is less important since the generator driving belt loads are lower than the cranking belt loads.

The tensioner body may contain a single spring for tensioning both arms or separate springs for providing different tensioning loads on the two arms. The fixed tensioner body may mount a surrounding bearing for carrying the idler pulley. The total system should be designed to provide maximum belt wrap around the pulleys where that is important, as in the MG pulley and, secondarily, the crank pulley, while lesser belt wrap on the one or more accessory drive units is generally satisfactory. Since movement of the primary tensioner between the crank and the MG may be limited by the desire for kinematic singularity, the secondary tensioner is necessarily designed to absorb the additional slack created in the system by its design and the need to accommodate belt wear during use.

Many possible arrangements of the elements may be used, as dictated in part by the necessary arrangement of components on the engine and the number of accessories to be driven by the belt system. Therefore, the various embodiments subsequently described are intended to be exemplary only and not to limit the scope of the invention.

These and other features and advantages of the invention will be more fully understood from the following description of certain specific embodiments of the invention taken together with the accompanying drawings.

BRIEF DESCRIPTION OF THE DRAWINGS

FIG. 1 is a schematic view of a simple crank drive belt system according to the invention having a crank, a motor generator, and a single accessory driven by the belt;

FIG. 2 is a schematic view of an alternative crank drive belt system wherein the belt drives three accessories in addition to the crank and MG; and FIG. 3 is a view similar FIG. 2, but showing an alternative arrangement of the driven components.

DESCRIPTION OF THE PREFERRED EMBODIMENT

Referring first to FIG. 1 of the drawings in detail, numeral 10 generally indicates a crank drive belt system in accordance with the invention. The phrase "crank drive" is utilized to indicate that the belt system is used both to crank the engine and to operate the engine in the drive mode wherein the crank drives the accessories and the motor generator (MG). System 10 represents a simplified arrangement which includes a drive belt 12 which drivingly connects a crank pulley 14 with a motor generator (MG) pulley 16 and an additional accessory pulley, such as air conditioner pulley 18.

The belt 12 wraps around the three pulleys and extends between them in three spans including a crank span 20 from the air conditioner to the crank, an MG span 22 from the crank to the MG, and an AC span 24 from the MG to the air conditioner.

A triple pulley tensioner assembly 26 is provided to maximize the belt wrap around primarily the MG and crank pulleys and secondarily the AC pulley. Tensioner assembly 26 includes a tensioner body 28 which is fixed to the engine frame, or to an associated bracket not shown, and carries internally one or more tensioner springs not shown. Housing 28 carries a suitable bearing, such as a needle bearing, which may be mounted on the exterior of the tensioner body 28. The bearing in turn carries a fixed idler pulley 32 which permanently engages the crank span 20 of the belt and is positioned to maximize the belt wrap around the crank pulley.

The tensioner body 28 pivotably supports first and second tensioners 34, 36 comprising arms carrying respectively first and second tensioner pulleys 38, 40 which respectively engage the outer sides of belt spans 22 and 24. Again, the pulleys are positioned so as to maximize the belt wrap around the crank pulley 14 and the MG pulley 16.

The first tensioner 34 is oriented to approach kinematic singularity during engine starting when the MG motors the crank pulley as well as the AC pulley. At this time, the highest belt loads occur in the MG span between the crank and MG pulleys where the force required to rotate the engine is delivered by the belt from the MG pulley to the crank pulley. In this condition, shown in the drawing, the force of the belt pulls the tensioner pulley 38 to a position where the belt forces are colinear with the tensioner arm and will not pivot the first tensioner 34 any further, although the tensioner has additional travel built in so that it is not moved against a fixed stop. In this condition, the slack in the belt is taken up by the second tensioner 36 and its pulley in belt span 24 between the motor generator and the air conditioner 18. Thus, the belt system is fully tensioned while the greatest loads are carried between the MG belt span 22.

In the driving mode, after the engine is started, the crank 14 drives the air conditioner pulley 18 and MG pulley 16 through belt spans 20 and 24 while the MG span 22 becomes the slack side of the belt. In this condition, tensioner pulley 38 is pivoted clockwise (or counterclockwise if desired) to take up the slack in the belt found in span 22. At the same time, the tensioner pulley 40 is pulled outward by the belt load in span 24 so that the tensioner 36 approaches a position of kinematic singularity where no further motion occurs while the belt is loaded in this direction.

Thus, it is seen that whether the belt system is operated in the starting condition, where the motor generator drives the crank, or the driving condition, where the crank drives the accessory and motor generator, the triple pulley tensioner maintains a near-optimal tension on the total belt system. Also, neither of the tensioner arms is moved sufficiently to engage a stop and the tensioners thus maintain continuous tension on their respective belt spans. Further, the arrangement of the system is such as to maintain maximum belt wrap on the MG and crank pulleys 16, 14 and, secondarily, on the AC pulley 18.

Referring now to FIG. 2 of the drawings, there is shown a second exemplary embodiment of crank drive belt system 42 according to the invention and wherein like numeral indicate like parts. Thus, belt system 42 includes a belt 44 driveably connecting the crank pulley 14 with the MG pulley 16 and AC pulley 18 as well as a power steering (PS) pulley 46 and a water pump (WP) pulley 48 plus an additional idler pulley 50 in additional to the fixed idler pulley 32. The belt length is divided into several spans including an MG span 52 which extends around both idler pulleys 50, 32, a PS span 54 from the MG pulley 16 to the PS pulley 46, an AC span 56 from the PS pulley around the water pump pulley 48 to the AC pulley 18, and a crank span 58 from the AC pulley 18 to the crank pulley 14. In system 42, primary attention is given to maximizing belt wrap around the MG pulley 16 while maintaining belt wrap around the crank pulley 14 at about a half circle or 180 degrees.

Of significance in this embodiment, as in the previous one, the first tensioner is positioned to approach kinematic singularity when the system is operated in the starting mode with the MG driving the crank. In this condition, the portion of the MG belt span 52 which runs between the idler pulley 32 and the MG 16 is tensioned by the first tensioner pulley 38, which is biased in a clockwise direction against the outside of the belt. In the MG motoring or engine cranking mode, this portion of the belt approaches a straight line because of the belt loading, which is maximized during MG rotation of the crank, so that the first tensioner pulley is moved as far to the left as the belt can take it without reaching a stop. Thus, kinematic singularity is accomplished. During this condition, tensioner 36, biasing pulley 40 in a counterclockwise direction, takes up the slack in the PS belt span 54 connecting the power steering pulley 46 with the motor generator pulley 16. Since the other rotational members of the system are fixed, the belt wrap around the crank pulley 14 and the accessory drive pulleys remains the same under either drive condition.

After the engine is started and the crank pulley takes over driving the belt system, including the MG pulley, the load on the PS belt span 54 increases. This causes the second tensioner pulley 40 to shift clockwise toward a position of kinematic singularity by reason of the angle of the tensioner 36, which is aligned with the force exerted on the pulley by the belt. At the same time, tensioner 34 pivots pulley 38 clockwise to take up the slack in the MG belt span in the portion of that span between the MG pulley 16 and the fixed idler pulley 32.

FIG. 3 represents a third exemplary embodiment similar to that of FIG. 2 but in which the water pump pulley 48 is repositioned in place of idler pulley 50. Also, the idler pulley 32 mounted on the tensioner body 28 is relocated between the MG pulley and the PS pulley. The result is a crank drive belt system 60 having a belt 62 which has approximately a half circle wrap around the crank pulley 14 and greater than a half circle wrap around the MG pulley 16 by reason of the position of the water pump 48 and the arrangement of the tensioner assembly 26. Tensioner 34 operates as before on the MG belt span 52 and is positioned so that the arm is co-linear with the belt tension force vector when the motor generator is driving the crank. Thus, in starting the engine, the arm again provides kinematic singularity without moving against a physical stop for the first tensioner 34. When the crank is driving the system, the first tensioner 34 pivots clockwise, taking up slack in the belt span 52 and maintaining the system under tension.

Similarly, belt span 54 is tensioned by the counterclockwise bias of second tensioner 36 which takes up slack in the system when the motor generator is driving the crank. However, when the crank is driving the motor generator, belt span 54 between the motor generator pulley 16 and idler 32 tends to straighten, depending on the load on the belt, which forces the second tensioner 36 clockwise against the bias of its spring. This motion is limited, however, as the portion of the span approaches a straight line at which point the second tensioner 36 and its pulley 40 approach singularity by reason of the straight line of the span being unable to further move the tensioner out of its tensioning position.

Thus, in operation, the embodiment of FIG. 3 operates basically in the same manner as that of FIG. 2 although the arrangement is physically different in certain specific details.

It should be recognized that in each of the described embodiments, the method of biasing the triple pulley tensioner may be accomplished in any suitable manner. One preferred manner is the use of a single spring connected with both tensioner arms and biasing them toward each other. However, with some arrangements they could be biased apart equally well. Another alternative is the use of separate springs for each tensioner arm which could provide differing response loading to the two arms and may be preferable in view of the different load conditions of the spans of various alternative embodiments. Additionally, biasing devices other than springs, such as hydraulic or gas pressure or resilient elements such as rubber, could be applied in actuating the biasing members if substitution of such other arrangements appears desirable.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A crank drive belt system for an engine having a belt drivingly connected between a crank pulley, a motor generator pulley and at least one accessory drive pulley, the system alternately driven by the motor generator pulley for cranking the engine and by the crank pulley for driving a motor generator and an accessory, said system including a triple pulley tensioner comprising:

a tensioner body fixed to the engine;

a fixed idler pulley rotatably mounted on the tensioner body and engaging the belt at a location displaced from the motor generator;

a first tensioner pivoted on the body and having a first pulley tensioning the outer side of the belt adjacent the motor generator pulley on a belt span from the crank pulley to the motor generator pulley to maximize belt wrap around the motor generator pulley and take up slack in the belt during crank drive of the motor generator; and a second tensioner pivoted on the body and having a second pulley tensioning the outer side of the belt adjacent the motor generator on a belt span from the motor generator pulley to the crank pulley to maximize belt wrap around the motor generator pulley and take up slack in the belt during motor generator drive of the crank.

2. A belt system as in claim 1 wherein during motor generator drive of the crank the first tensioner reaches kinematic singularity, where the force of the driven belt span can cause only insubstantial yielding motion of the first tensioner, prior to reaching its maximum stroke.

3. A belt system as in claim 1 wherein during crank drive of the motor generator the second tensioner reaches kinematic singularity prior to reaching its maximum stroke.

4. A belt system as in claim 1 wherein the tensioner body includes at least one tensioner spring biasing the tensioner pulleys against their associated belt spans.

5. A belt system as in claim 4 wherein the tensioner body includes plural springs for providing diverse tensioner loads against the first and second tensioners.

6. A belt system as in claim 1 wherein the tensioner body carries a bearing that rotatably supports the fixed idler pulley.

7. A belt system as in claim 1 wherein the pulleys in the belt system are positioned to provide at least a semi-circle of belt wrap around the crank pulley.

8. A belt system as in claim 1 wherein the belt system includes at least one additional accessory drive pulley.

9. A belt system as in claim 1 wherein the belt system includes at least one additional idler pulley.

* * * * *